(12) United States Patent
Barsness et al.

(10) Patent No.: US 9,830,251 B2
(45) Date of Patent: *Nov. 28, 2017

(54) STREAMING BREAKPOINT FOR DATA TUPLES BASED ON RESOURCE USAGE

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,641

(22) Filed: Jan. 13, 2017

(65) Prior Publication Data
US 2017/0147473 A1    May 25, 2017

Related U.S. Application Data

(63) Continuation of application No. 14/840,930, filed on Aug. 31, 2015, which is a continuation of application No. 14/827,894, filed on Aug. 17, 2015, now Pat. No. 9,619,365.

(51) Int. Cl.
G06F 11/36    (2006.01)
(52) U.S. Cl.
CPC ........ *G06F 11/3636* (2013.01); *G06F 11/362* (2013.01); *G06F 11/3664* (2013.01)

(58) Field of Classification Search
None
See application file for complete search history.

(56) References Cited

U.S. PATENT DOCUMENTS

| | | |
|---|---|---|
| 6,330,008 B1 | 12/2001 | Razdow et al. |
| 8,245,212 B2 | 8/2012 | Steiner |
| 8,527,458 B2 | 9/2013 | Park et al. |
| 8,560,527 B2 | 10/2013 | Santosuosso et al. |
| 8,601,458 B2 | 12/2013 | Andrade et al. |
| 8,656,396 B2 | 2/2014 | Andrade et al. |

(Continued)

OTHER PUBLICATIONS

Stewart et al., "Non-Stop Monitoring and Debugging on Shared-Memory Multiprocessors", Proceedings of Second International Workshop on Software Engineering for Parallel and Distributed Systems, May 17-18, 1997, pp. 263-269.*

(Continued)

*Primary Examiner* — H S Sough
*Assistant Examiner* — Timothy Duncan
(74) *Attorney, Agent, or Firm* — Martin & Associates, LLC; Derek P. Martin

(57) ABSTRACT

A streams manager monitors data tuples processed by a streaming application represented by an operator graph. The streams manager includes a tuple breakpoint mechanism that allows defining a tuple breakpoint that fires based on resource usage by the data tuple. When the tuple breakpoint fires, one or more operators in the operator graph are halted according to specified halt criteria. Information corresponding to the breakpoint that fired is then displayed. The tuple breakpoint mechanism thus provides a way to debug a streaming application based on resource usage by data tuples.

8 Claims, 7 Drawing Sheets

(56) References Cited

U.S. PATENT DOCUMENTS

| | | |
|---|---|---|
| 8,850,269 B2 | 9/2014 | Branson et al. |
| 8,949,210 B2 | 2/2015 | Nano et al. |
| 2006/0200807 A1 | 9/2006 | Bates et al. |
| 2009/0119493 A1 | 5/2009 | Venkitachalam et al. |
| 2010/0234349 A1 | 9/2010 | Kuno et al. |
| 2010/0281310 A1 | 11/2010 | Hou et al. |
| 2012/0331125 A1 | 12/2012 | Li et al. |
| 2013/0014088 A1 | 1/2013 | Park et al. |
| 2013/0103832 A1 | 4/2013 | Cradick et al. |
| 2013/0290969 A1 | 10/2013 | Branson et al. |
| 2013/0305225 A1 | 11/2013 | Branson et al. |
| 2014/0013309 A1 | 1/2014 | Gounares |
| 2014/0089373 A1 | 3/2014 | Branson et al. |
| 2014/0236920 A1 | 8/2014 | Branson et al. |
| 2014/0379711 A1 | 12/2014 | Branson et al. |
| 2015/0007144 A1 | 1/2015 | Barsness et al. |

OTHER PUBLICATIONS

Krishnan, "Hardware Breakpoint (or watchpoint) usage in Linux Kernel", Proceedings of the Linux Symposium, Montreal, Quebec Canada, Jul. 13-17, 2009, pp. 149-158.*

Barsness et al., "Streaming Breakpoint for Data Tuples That Stay in an Operator Graph Too Long" U.S. Appl. No. 14/806,756, filed Jul. 23, 2015.

Barsness et al., "Streaming Breakpoint for Data Tuples That Stay in an Operator Graph Too Long" U.S. Appl. No. 14/815,233, filed Jul. 31, 2015.

Barsness et al., "Streaming Breakpoint for Data Tuples Based on Resource Usage" U.S. Appl. No. 14/827,894, filed Aug. 17, 2015.

Barsness et al., "Streaming Breakpoint for Data Tuples Based on Resource Usage" U.S. Appl. No. 14/840,930, filed Aug. 31, 2015.

Barsness et al., "Streaming Breakpoint for Data Tuples Based on Resource Usage" U.S. Appl. No. 15/406,630, filed Jan. 13, 2017.

Appendix P—List of IBM Patents or Patent Applications Treated As Related, dated Mar. 1, 2017.

Gedik, et al. "Tools and strategies for debugging distributed stream processing applications." Software: Practice and Experience 39.16 (2009): 1347-1376.

De Pauw, et al. "Visual debugging for stream processing applications." Proceedings of the First international conference on Runtime verification. Springer-Verlag, 2010.

Bemheim, Alice Jane, "A Debugger-Friendly Distributed Tuple Space", Thesis at Williams College, Jan. 6, 1997, http://citeseerx.ist.psu.edu/viewdoc/download?doi=10.1.1.23.2164&rep=rep1&type=pdf, accessed on Sep. 30, 2016.

Bercovitz et al., "Tuplescope: A Graphical Monitor and Debugger for Linda-Based Parallel Programs", Yale University Department of Computer Science, YALEU/DCS/RR-782, Apr. 1990, http://webmail.cs.yale.edu/publications/techreports/tr782.pdf, accessed on Sep. 30, 2016.

* cited by examiner

STREAMING BREAKPOINT FOR DATA TUPLES BASED ON RESOURCE USAGE

BACKGROUND

1. Technical Field

This disclosure generally relates to streaming applications, and more specifically relates to enhancing debugging of a streaming application using breakpoints for data tuples based on resource usage.

2. Background Art

Streaming applications are known in the art, and typically include multiple operators coupled together in an operator graph that process streaming data in near real-time. An operator typically takes in streaming data in the form of data tuples, operates on the data tuples in some fashion, and outputs the processed data tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

Cloud-based streaming is known in the art. Known systems for cloud-based streaming do not monitor the resource usage of data tuples.

BRIEF SUMMARY

A streams manager monitors data tuples processed by a streaming application represented by an operator graph. The streams manager includes a tuple breakpoint mechanism that allows defining a tuple breakpoint that fires based on resource usage by the data tuple. When the tuple breakpoint fires, one or more operators in the operator graph are halted according to specified halt criteria. Information corresponding to the breakpoint that fired is then displayed. The tuple breakpoint mechanism thus provides a way to debug a streaming application based on resource usage by data tuples.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
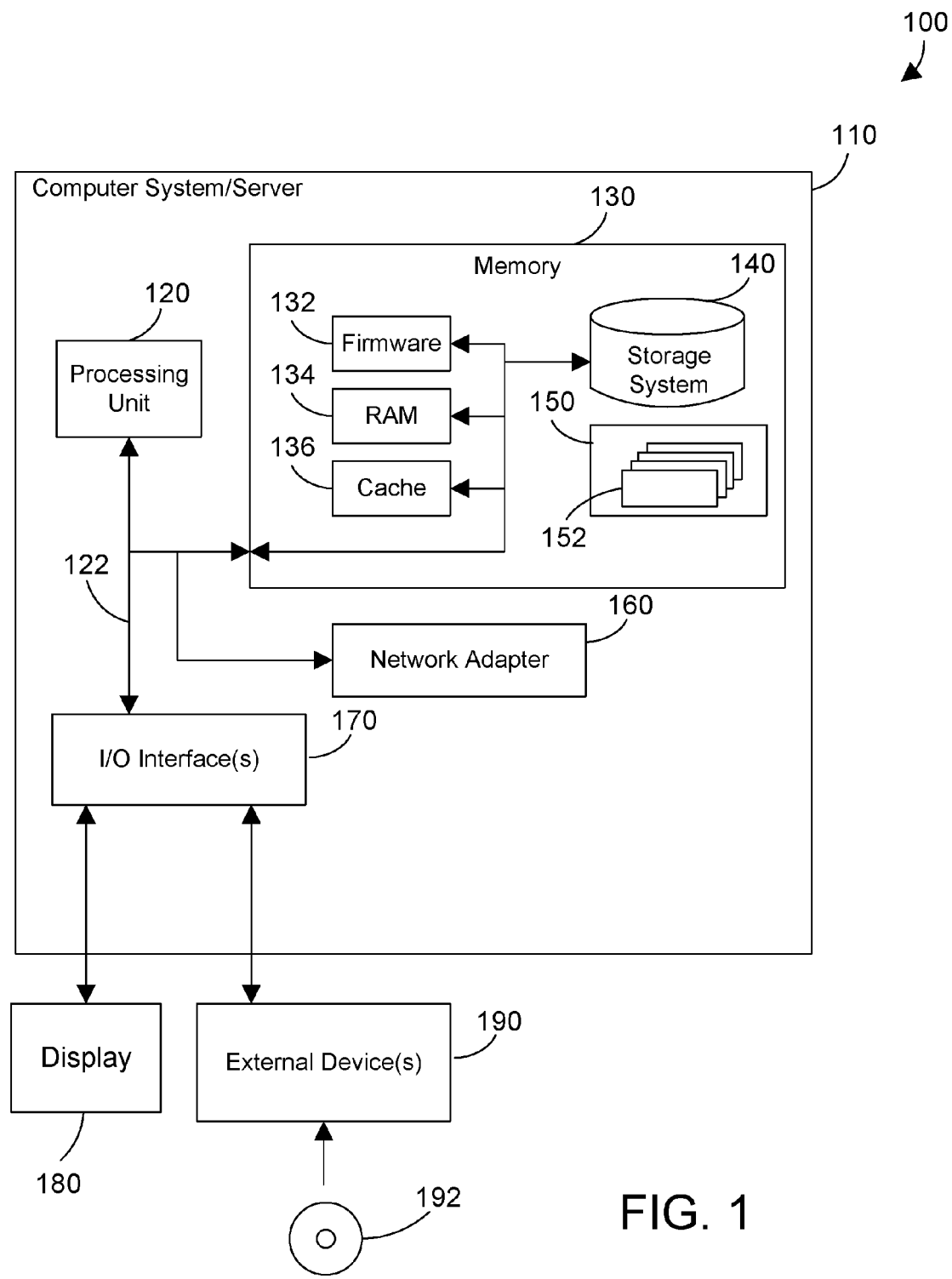
FIG. 1 is a block diagram of a cloud computing node.

The disclosure and claims herein relate to a streams manager that monitors data tuples processed by a streaming application represented by an operator graph. The streams manager includes a tuple breakpoint mechanism that allows defining a tuple breakpoint that fires based on resource usage by the data tuple. When the tuple breakpoint fires, one or more operators in the operator graph are halted according to specified halt criteria. Information corresponding to the breakpoint that fired is then displayed. The tuple breakpoint mechanism thus provides a way to debug a streaming application based on resource usage by data tuples.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
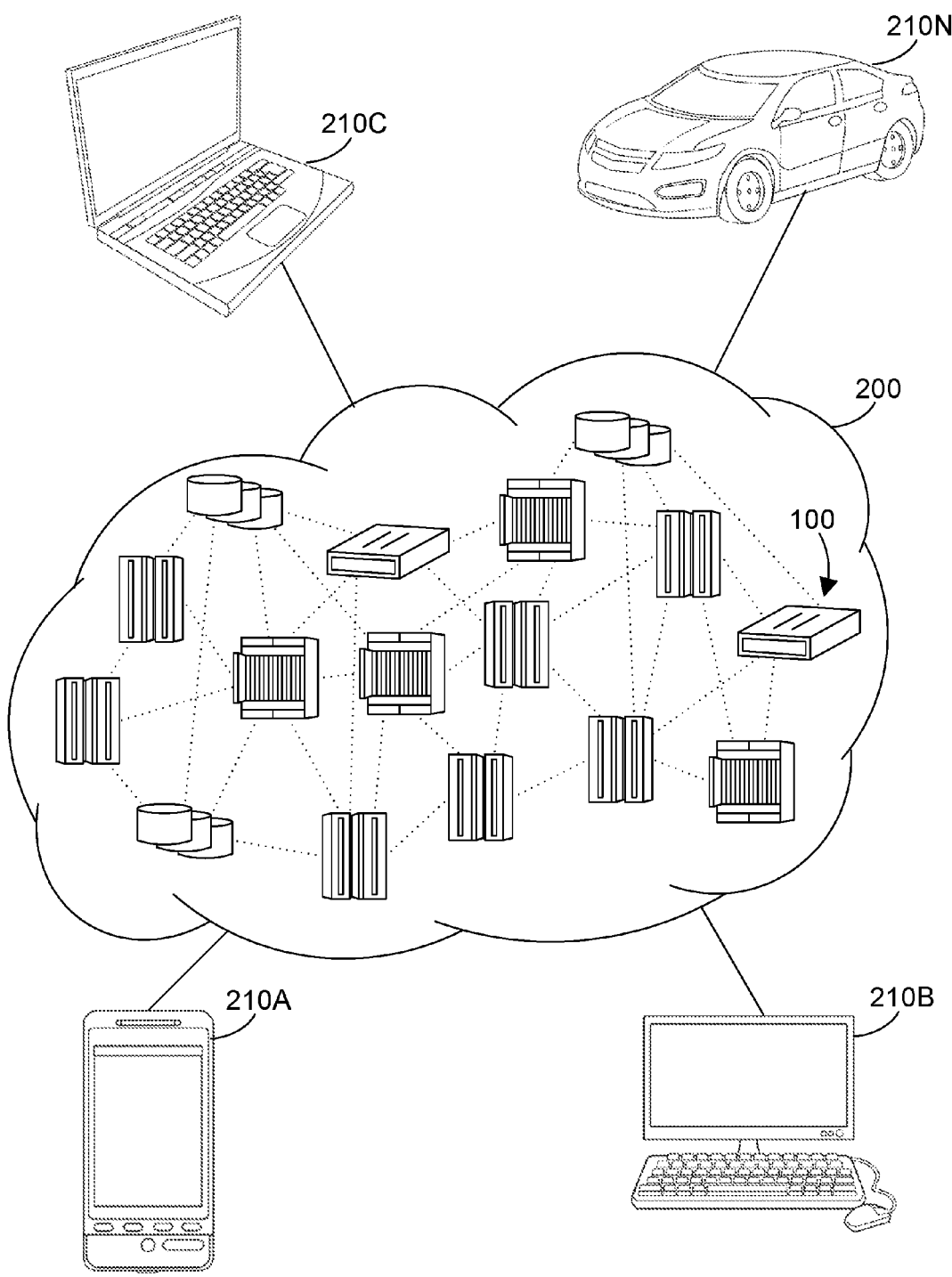
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
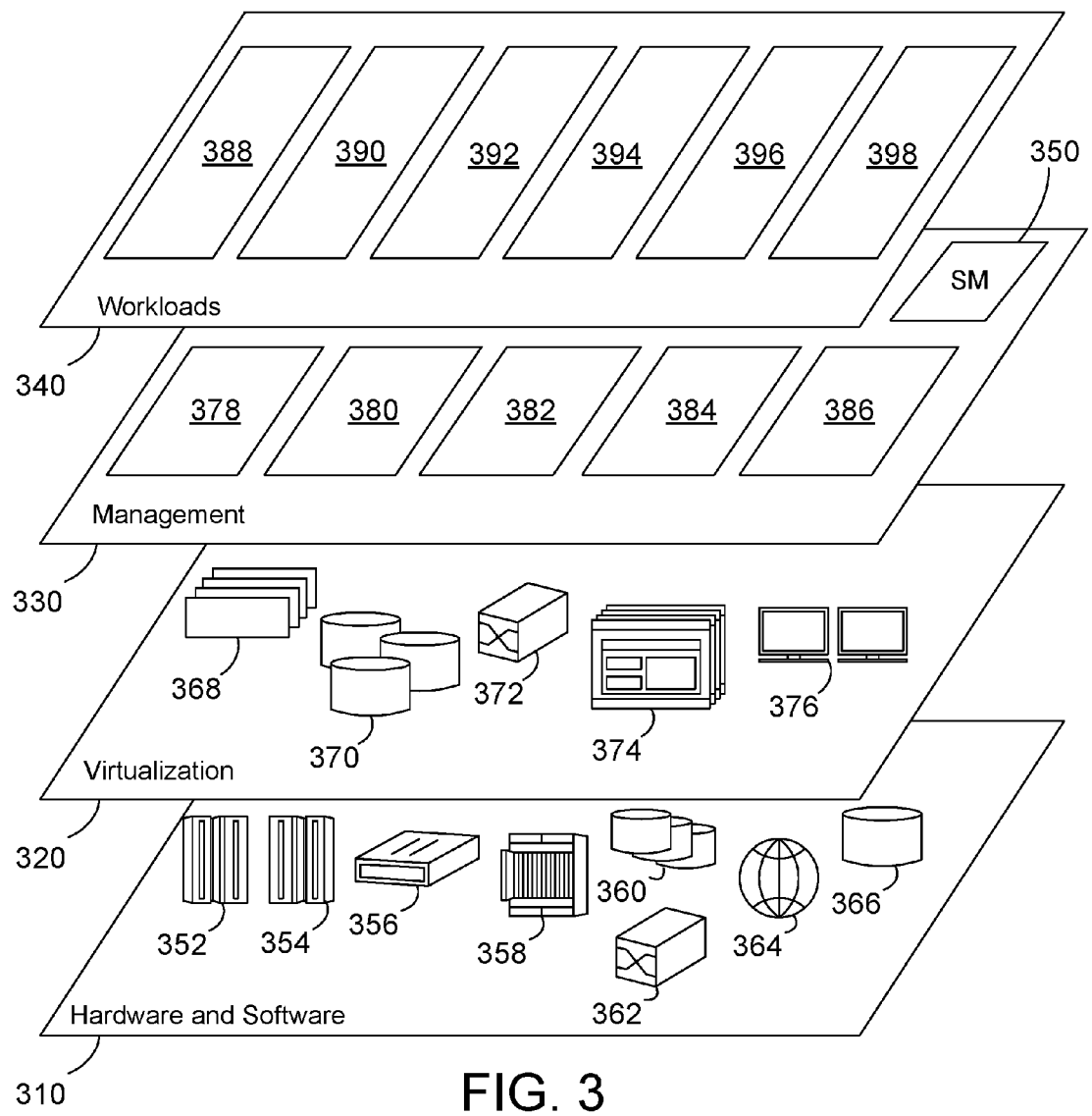
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a streams manager (SM) 350 as described herein. While the streams manager 350 is shown in FIG. 3 to reside in the management layer 330, the streams manager 350 actually may span other levels shown in FIG. 3 as needed.

Workloads layer 340 provides examples of functionality for which the cloud computing environment may be utilized. Examples of workloads and functions which may be provided from this layer include: mapping and navigation 388; software development and lifecycle management 390; virtual classroom education delivery 392; data analytics processing 394; transaction processing 396 and mobile desktop 398.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
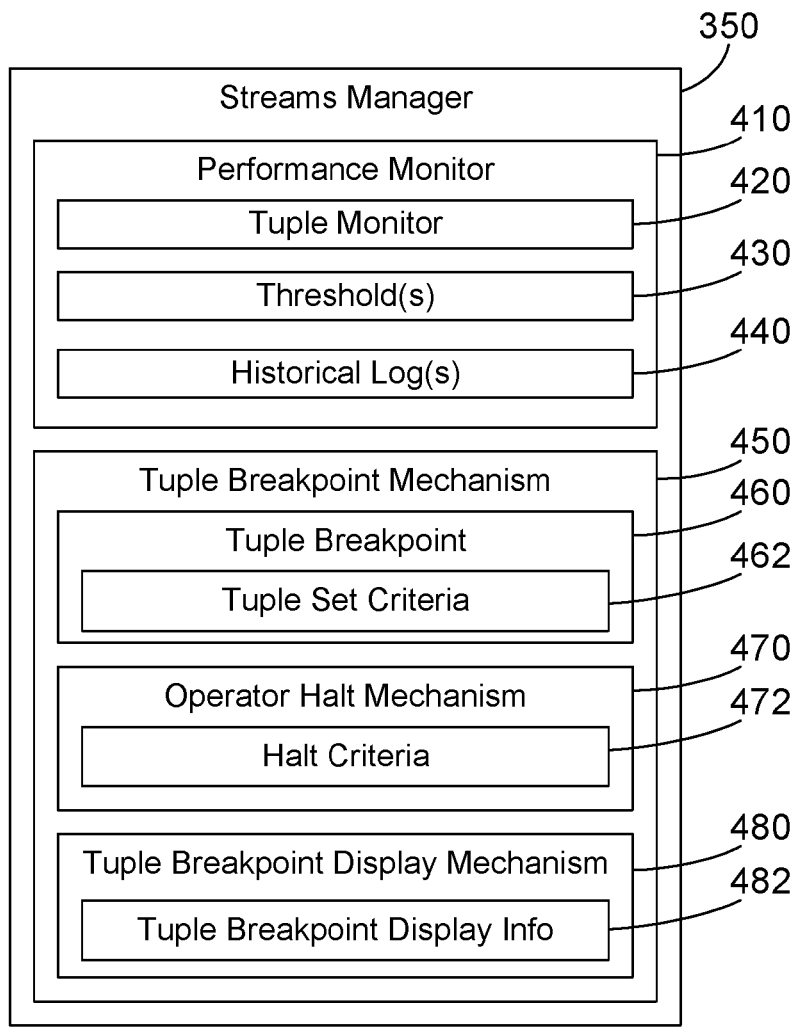
FIG. 4 is a block diagram showing some features of a streams manager.
Figure 5:
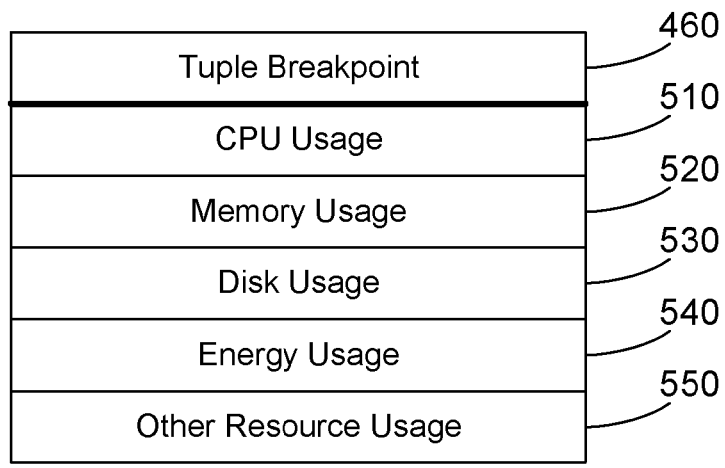
FIG. 5 is a table showing some suitable examples of breakpoint criteria for a tuple breakpoint based on resource usage by data tuples.

FIG. 4 shows one suitable example of the streams manager 350 shown in FIG. 3. The streams manager 350 is software that manages one or more streaming applications, including creating operators and data flow connections between operators in an operator graph that represents a streaming application. The streams manager 350 includes a performance monitor 410 and a tuple breakpoint mechanism 450. The performance monitor 410 preferably includes a tuple monitor 420, one or more thresholds 430, and one or more historical logs 440. The tuple monitor 420 monitors data tuples processed by operators in an operator graph, and logs the monitored information in historical log(s) 440. The thresholds 430 may include any suitable criteria, including criteria that determines when a tuple breakpoint fires. Thus, in one implementation, the performance monitor 410 may compare the data in the historical log(s) 440 to the threshold(s) 430 and may then signal the tuple breakpoint mechanism 450 that the threshold(s) 430 have been satisfied, causing a tuple breakpoint to fire in the tuple breakpoint mechanism 450. In an alternative implementation, the threshold(s) 430 in the performance monitor are not related to breakpoint processing, with the tuple breakpoint mechanism 450 determining when a defined tuple breakpoint 460 fires based on information in the historical log(s) 440 of the performance monitor. The tuple breakpoint 460 preferably specifies at least one breakpoint criterion. Suitable examples of breakpoint criteria for tuple breakpoint 460 are shown in FIG. 5 to include CPU usage 510, memory usage 520, disk usage 530, energy usage 540, and other resource usage 550. CPU usage 510 preferably specifies a threshold amount of CPU usage for a data tuple or a defined set of data tuples. This CPU usage could be specified from the time the data tuple was created, or from the time the data tuple was first operated on by an operator in the operator graph. The CPU usage can be specified in any suitable way, including processor-seconds, cycles, time-slices, bogomips, etc.

The memory usage 520 for a data tuple specifies a threshold for memory usage by a data tuple or a defined set of data tuples. The memory usage 520 can be specified in any suitable way, including memory size such as megabytes, memory size as a percentage of system resources, a percentage of virtual memory allocated to a virtual machine, number of memory accesses, number of access to certain type of memory, or amount of memory of a certain type of memory, i.e., flash etc.

The disk usage 530 for a data tuple specifies a threshold for disk usage by a data tuple or a defined set of data tuples. The disk usage 530 can be specified in any suitable way, including number of disk reads, number of disk writes, average size of read or write, number of disk reads or writes to specific disks, disk size such as megabytes, a percentage of a virtual disk allocated to a virtual machine, etc.

The energy usage 540 for a data tuple specifies a threshold for energy usage by a data tuple or a defined set of data tuples. The energy usage 540 can be specified in any suitable way, including milliwatts, joules, British Thermal Units (BTUs), a percentage of energy used by a virtual machine, etc.

Other resource usage 550 represents that usage of other resources could also be criteria for defining a tuple breakpoint 460. Other resource usage 550 could include, for example, usage of a physical or virtual LAN, or usage of any other suitable resource in a computer system, either hardware or software, whether currently known or developed in the future. The criteria in FIG. 5 for tuple breakpoint 460 are shown by way of example, and are not limiting. The disclosure and claims herein expressly extend to any suitable criteria, including combinations of criteria, that can determine when a tuple breakpoint fires based on usage of one or more resources in a computer system by a data tuple or a set of data tuples.

Figure 6:
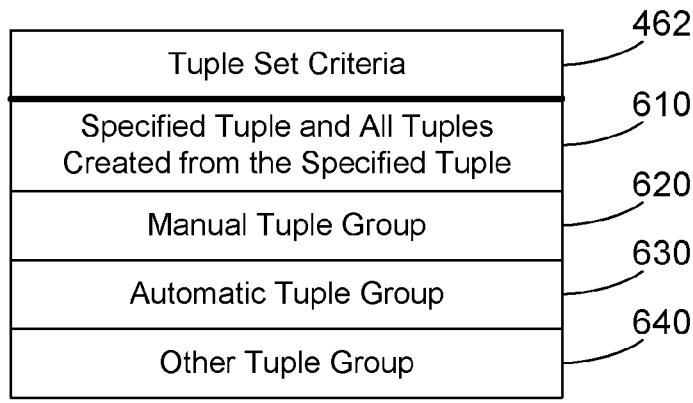
FIG. 6 is a table showing some suitable examples of tuple set criteria.

Referring again to FIG. 4, the tuple breakpoint 460 may specify at least one tuple set criterion, shown in FIG. 4 is tuple set criteria 462, which groups data tuples into a tuple set. Examples of suitable tuple set criteria 462 are shown in FIG. 6 to include a specified data tuple and all data tuples created from the specified data 610; a manual tuple group 620, which represents a data tuple group manually defined by a system administrator; an automatic tuple group 630, which represents a data tuple group automatically defined according to some specified criterion or criteria; and other tuple group 640, which represents any suitable grouping of data tuples. The set criteria 462 allows defining tuple sets for which resource usage may be monitored and for which breakpoints may be defined. A simple example will illustrate. Let's assume the tuple set criteria 462 includes a specified data tuple and all data tuples created from the specified data tuple 610. For this specific example, a breakpoint could be defined for this tuple set, which means the resource usage by all of the data tuples in the tuple set is monitored and added, and when the resource usage specified in the breakpoint for this tuple set is exceeded, the breakpoint fires. In an alternative implementation, a tuple set may be defined, and a breakpoint can fire when resource usage by any of the data tuples in the tuple set causes the tuple breakpoint to fire. The concept of a tuple set thus allows both monitoring of resource usage by the performance monitor 410 over multiple data tuples in a tuple set, and defining one or more breakpoints in terms of resource usage of all of the data tuples in the tuple set.

Figure 7:
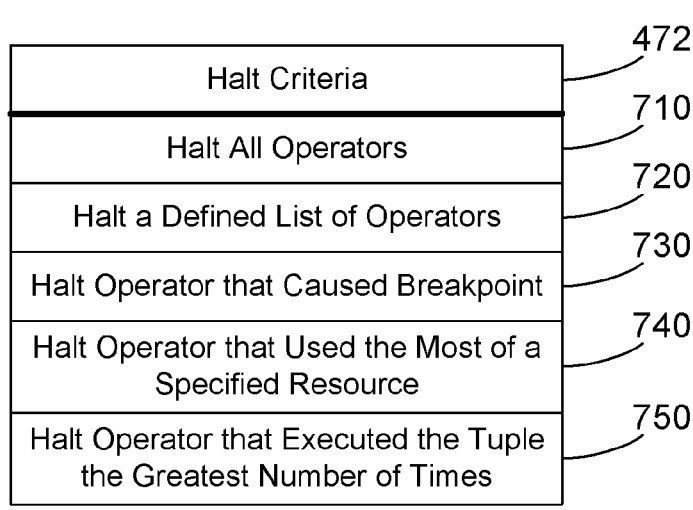
FIG. 7 is a table showing some suitable examples of halt criteria that could be specified for a tuple breakpoint.

Referring to FIG. 4, the tuple breakpoint mechanism 450 includes an operator halt mechanism 470 that is used when a tuple breakpoint 460 fires. The operator halt mechanism 470 defines at least one halt criterion, shown as halt criteria 472 in FIG. 4, which specifies one or more operators to halt when a breakpoint fires. Suitable examples of halt criteria 472 are shown in FIG. 7 to include halt all operators 710; halt a defined list of operators 720; halt an operator that caused a breakpoint 730 to fire; halt an operator that used the most of a specified resource 740; and halt an operator that executed the data tuple the greatest number of times 750. Note that halting a defined list of operators 720 can include halting all operators 710 when all operators are on the defined list. In one suitable implementation, each defined tuple breakpoint 460 has its own corresponding halt criteria 472. However, in a different implementation, halt criteria 472 could apply to all breakpoints, or to a specified subset of breakpoints.

Figure 8:
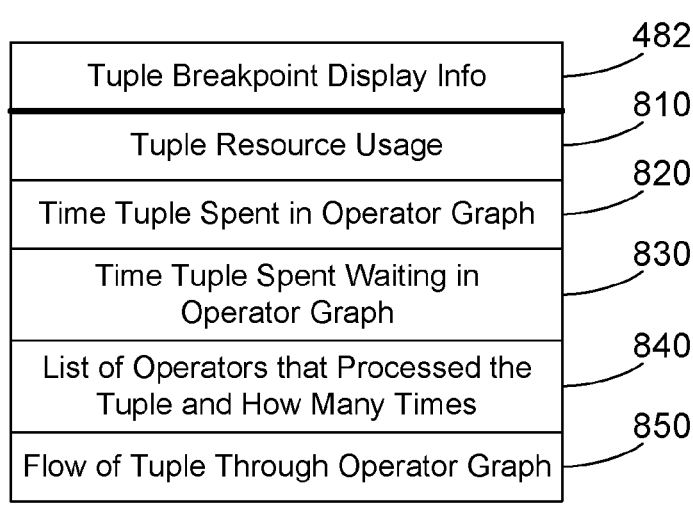
FIG. 8 is a table showing some suitable examples of information that could be displayed when a tuple breakpoint fires.

The tuple breakpoint display mechanism 480 in FIG. 4 displays to a user tuple breakpoint display information 482. Examples of the tuple breakpoint display information 482 are shown in FIG. 8 to include: tuple resource usage 810; time a data tuple spent in the operator graph 820; time the data tuple spent waiting in the operator graph 830; a list of operators that processed the data tuples and how many times 840; and the flow of the data tuple through the operator graph 850. This information can help a user debug a streaming application when data tuples are using an excessive amount of resources, as defined by the breakpoint criteria in the tuple breakpoint.

Figure 9:
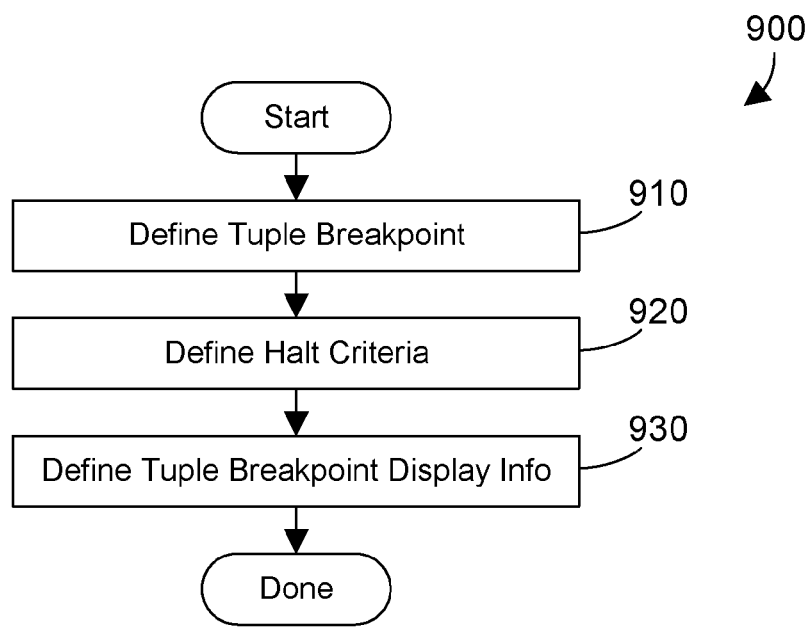
FIG. 9 is a flow diagram of a method for defining a tuple breakpoint.

FIG. 9 shows a method 900 for defining a tuple breakpoint, such as tuple breakpoint 460 shown in FIGS. 4 and 5. At least one breakpoint criterion is defined (step 910). At least one halt criterion is defined (step 920). Tuple breakpoint display information is also defined (step 930). Method 900 is then done. With the tuple breakpoint defined as shown in method 900 in FIG. 9, the streaming application can be executed. When the breakpoint criteria defined in step 910 is satisfied, the tuple breakpoint fires.

Figure 10:
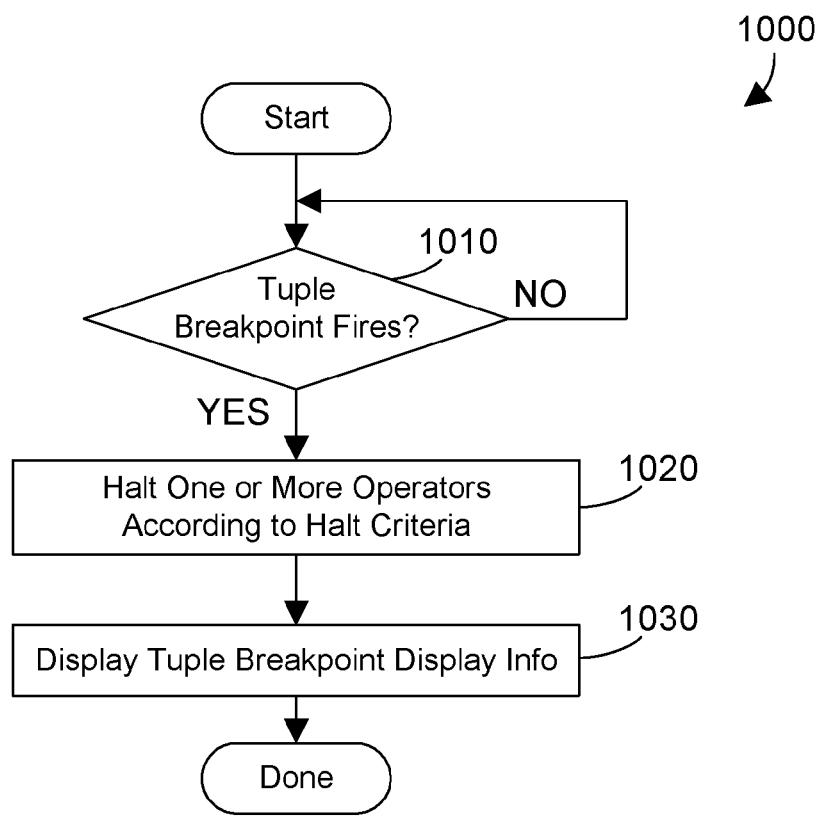
FIG. 10 is a flow diagram of a method for processing a tuple breakpoint when it fires.

Referring to FIG. 10, a method 1000 shows what happens when a tuple breakpoint fires. As long a no tuple breakpoint fires (step 1010=NO), method 1000 loops back and continues monitoring. When a tuple breakpoint fires (step 1010=YES), one or more operators in the operator graph are halted according to the defined halt criteria (step 1020), and the tuple breakpoint display information is displayed (step 1030). Method 1000 is then done.

Figure 11:
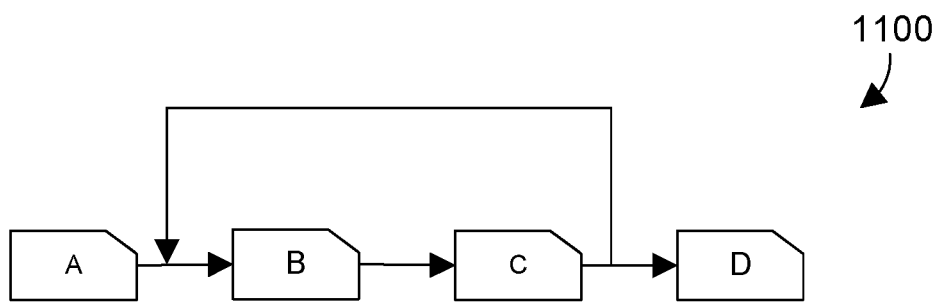
FIG. 11 is a block diagram showing a specific example of an operator graph corresponding to a streaming application.
Figure 12:
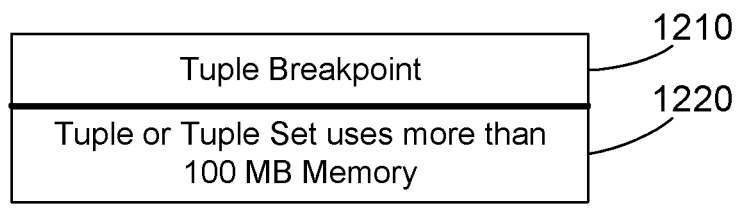
FIG. 12 is a table showing tuple breakpoint criteria for the specific example in FIG. 11.
Figure 13:
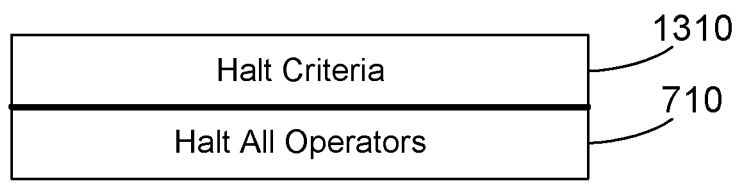
FIG. 13 is a table showing halt criteria for the tuple breakpoint shown in FIG. 12.

A simple example is provided in FIGS. 11-13 to illustrate the concepts discussed above. A simple operator graph 1100 is shown in FIG. 11 to include four operators, A, B, C and D. Operator A is a source of data tuples. Operator B processes data tuples received from Operator A and also processes data tuples received from Operator C. Operator C processes data tuples received from Operator B, and outputs data tuples either to Operator D or to Operator B for further processing. In this simple example, we assume Operator C includes logic to determine whether a data tuple has been sufficiently processed or not. If a data tuple has been sufficiently processed, the data tuple is output to Operator D, which is a sink for operators. If the data tuple has not been sufficiently processed, the data tuple is fed back to Operator B, which processes the data tuple again. Because of this feedback path from operator C to Operator B, it is possible for data tuples to use significant resources, especially after repeated loops through the operator graph. Of course, in other configurations, it is possible for a tuple to use significant resources even when the tuple does not feed back in the operator graph. The tuple breakpoint 460 defined herein allows a breakpoint to fire when resource usage by a tuple or a tuple set exceeds some defined threshold or criteria.

Referring to FIG. 12, we assume for this simple example a tuple breakpoint 1210 is defined that fires when a tuple or defined tuple set uses more than 100 MB of memory 1220. Tuple breakpoint 1210 in FIG. 12 is one suitable example for tuple breakpoint 460 shown in FIGS. 4 and 5. This means a threshold of 100 MB of memory is set for a tuple or tuple set. As long as a tuple or tuple set uses less than 100 MB of memory, the tuple breakpoint 1210 does not fire. When the usage of memory by a tuple or tuple set exceeds the 100 MB threshold defined at 1220, the breakpoint fires to indicate the tuple or tuple set has used more memory than the specified memory threshold. For the simple example in FIGS. 11-13, we assume halt criteria 1310 in FIG. 13 is defined that halts all operators 710. Thus, when the tuple breakpoint 1210 fires when the tuple or tuple set uses more than 100 MB of memory, all operators, namely, A, B, C and D in the operator graph 1100, are halted. Once all the operators are halted, any suitable information can be displayed to a user, including any or all of the tuple breakpoint display info shown in FIG. 8. Of course, other information not shown in FIG. 8 could also be displayed to the user when a breakpoint fires.

The tuple breakpoint mechanism disclosed and claimed herein provides an incredibly powerful and flexible way to debug streaming applications by detecting when data tuples use an amount of resources that exceeds a threshold set in one or more defined tuple breakpoints.

The disclosure and claims herein relate to a streams manager that monitors data tuples processed by a streaming application represented by an operator graph. The streams manager includes a tuple breakpoint mechanism that allows defining a tuple breakpoint that fires based on resource usage by the data tuple. When the tuple breakpoint fires, one or more operators in the operator graph are halted according to specified halt criteria. Information corresponding to the breakpoint that fired is then displayed. The tuple breakpoint mechanism thus provides a way to debug a streaming application based on resource usage by data tuples.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a streaming application residing in the memory and executed by the at least one processor, the streaming application comprising an operator graph that includes a plurality of data tuples;
   a performance monitor residing in the memory and executed by the at least one processor, the performance monitor monitoring resource usage of at least one computer system resource by each of the plurality of data tuples processed by the plurality of operators in the operator graph, wherein the resource usage for a selected data tuple comprises a usage of the at least one computer system resource during the processing of the selected data tuple by at least two of the plurality of operators that process the selected data tuple; and
   a tuple breakpoint mechanism residing in the memory and executed by the at least one processor, the tuple breakpoint mechanism including a tuple breakpoint that defines at least one criterion for usage of the at least one computer system resource by at least one data tuple, and when the tuple breakpoint mechanism determines the tuple breakpoint fires based on information from the performance monitor, the tuple breakpoint mechanism halts at least one operator in the operator graph and displays information regarding a data tuple that caused the tuple breakpoint to fire.

2. The apparatus of claim 1 wherein the resource usage comprises CPU usage and the at least one criterion for usage of the at least one resource specifies CPU usage.

3. The apparatus of claim 1 wherein the resource usage comprises memory usage and the at least one criterion for usage of the at least one resource specifies memory usage.

4. The apparatus of claim 1 wherein the resource usage comprises disk usage and the at least one criterion for usage of the at least one resource specifies disk usage.

5. The apparatus of claim 1 wherein the resource usage comprises energy usage and the at least one criterion for usage of the at least one resource specifies energy usage.

6. The apparatus of claim 1 wherein the at least one criterion for usage of the at least one resource specifies usage of the at least one resource for a defined set of multiple data tuples in the operator graph.

7. The apparatus of claim 1 wherein the tuple breakpoint mechanism halts an operator in the operator graph that caused the tuple breakpoint to fire.

8. The apparatus of claim 1 wherein the tuple breakpoint mechanism displays information regarding a data tuple that caused the tuple breakpoint to fire, wherein the displayed information comprises tuple resource usage of at least one computer system resource.

\* \* \* \* \*